Patented Dec. 20, 1932

1,891,701

UNITED STATES PATENT OFFICE

KASPAR WINKLER, OF ZURICH, SWITZERLAND

METHOD OF MANUFACTURING CONCRETE

No Drawing. Application filed August 14, 1930, Serial No. 475,381, and in Germany February 25, 1929.

This invention relates to a method of making Portland cement, electrocement and special cement or mortar or concrete made with these cements resistant to water, of advancing the setting, increasing the hardness and checking shrinkage.

It has long been known that the destruction of Portland cement and concrete buildings is principally due to the action of certain waters. Among these waters are acid containing effluents from factories, and ground and mountain waters containing calcium sulphate, magnesium sulphate and the like or free carbonic acid either alone or in mixtures. Water poor in chalk and sea water have shown themselves particularly active. Finally thermal waters, particularly such as contain sulphates have a particularly detrimental action on Portland cement and concrete.

Efforts have already been made to make Portland cement resistant to these waters by means of chemically known or unknown additions. For this purpose trass especially has been suggested. Under suitable conditions an addition of trass may produce the desired effect, but in most cases it fails. In all cases the effect of trass only begins after some months.

Additions of tar, bitumen, fats and oils in unchanged or in soluble form (mixed with alkalies) if necessary mixed with powdered stone, etc. and sulphates mostly produce a considerable deterioration in the mortar and concrete and these are either not at all or quite insufficiently immunized by these additions.

It has now been found that Portland cement, mortar and concrete made from Portland cement become very resistant to these waters if a part of the fine grained material (sand) is replaced by ordinary Portland cement clinker or clinker from other cement or clinker from a weakly hydrating cement, with a grain of about 0.15 to 2 mms. or more. The setting is considerably improved, the hardness is increased and shrinkage is checked.

The desired content of rough-grained clinker in the cement can be obtained by grinding the cement in a suitable manner so that a certain part of the clinker remains rough grained. Clinkers of various cements may be ground together or combined after grinding.

It has also been found that the compactness and resistance of mortar and concrete against the waters referred to can be still further increased if the above-mentioned clinker grains are also previously treated with solutions of compounds of alkalies and alkaline earth metals, for example, sodium or aluminium phosphate compounds or solutions of fluorine compounds or solutions of oxalic acid or its salts or are subjected to the action of the vapours of fluorine-containing acids and are then dried.

The effect of the immunization against attacking substances and the strength of the cement or mortar or concrete can be still further increased and the setting can be accelerated if the rough grained clinker is treated with one or more of the above-mentioned substances in succession and dried and added, with or without sand or sandy gravel to the cement used in the ordinary grinding and made into mortar or concrete.

These said effects can be still further increased by mixtures of the clinkers prepared as described being mixed with the cement used in the ordinary grinding. This last method has the advantage that the immunization and especially a very rapid setting and increase in hardness of the cement can be more reliably regulated.

The said regulation may, in certain cases, be obtained with greater certainty if instead of a part of the ingredients other materials, for example, those mentioned below, are treated with the above-mentioned substances, are dried and added to the cement used in ordinary grinding, either with or without sand or sandy gravel and treated with it. Such substances are ground building sand, powdered stone, pumice stone, tuff, slag, burnt or unburnt marl, bauxite, loam, which preferably are soaked with the above mentioned solutions, then dried and added to the clinker or the cement, gravel and stone, trass or kieselguhr, brick and chamotte, which are absorbent, and others. The previous treatment of the ingredients takes the place of the treatment of the rough grained clinker.

Rapid or two rapid setting is prevented by precipitating organic or inorganic material which may be capable of swelling directly on the coarse grained clinker or other ingredients. This treatment makes the mortar and concrete more resistant to moisture.

The setting may, on the other hand be accelerated by treating the clinker or other ingredients with solutions of metallic chlorides, alkali and alkaline earth lyes, carbonates, silicic acid and/or aluminium compounds or permanganate.

Instead of previously treating the ingredients with solutions of the substances concerned (compounds of alkali or alkaline earth metals and the like) as described above, these substances, or some of them may be mixed in the dry state with the clinker grains or the other ingredients.

In this case the materials with which the clinker or the ingredient is to be treated may be added directly to the raw material of the cement and burned together with this to a greater or less extent according to the requirements as regards the end product or according to the material used. It may also be added while the original cement material is being burned or towards the end of the burning either in solution or in a dry state. In this method of treatment the effect of the separate substances for the purpose of the invention may become greater.

What I claim is:—

1. A method of manufacturing special cement, comprising mixing cement with an addition of clinker of comparatively rough grain, said clinker having been previously treated with a compound selected from a group consisting of alkali compounds, alkaline earth compounds, oxalic acid, oxalates and fluorine-containing compounds.

2. A method of manufacturing special cement as described in claim 1 in which inert materials are treated together with clinker grains and added to the cement.

3. A method of manufacturing special concrete comprising mixing cement with clinker having a grain of 0.15 to 2 mm. to an amount above the usual cement norms, which is first treated with materials selected from a group consisting of alkali compounds, alkaline earth compounds, oxalic acid, oxalates and fluorine-containing compounds.

In testimony whereof, I hereunto set my hand this 29th day of July, 1930.

KASPAR WINKLER.